United States Patent [19]

George et al.

[11] Patent Number: 5,141,981

[45] Date of Patent: * Aug. 25, 1992

[54] STABILIZED POLYKETONE POLYMERS

[75] Inventors: Eric R. George, Houston; James H. Coker, Jr., Kingwood, both of Tex.

[73] Assignee: Shell Oil Company, Houston, Tex.

[*] Notice: The portion of the term of this patent subsequent to Jun. 4, 2008 has been disclaimed.

[21] Appl. No.: 588,894

[22] Filed: Sep. 27, 1990

[51] Int. Cl.$^5$ ................................................ C08K 3/32
[52] U.S. Cl. ............................................................. 524/417
[58] Field of Search ............................................. 524/417

[56] References Cited

U.S. PATENT DOCUMENTS

| | | | |
|---|---|---|---|
| 2,493,597 | 1/1950 | Rothrock et al. | 260/45.7 |
| 2,495,286 | 1/1950 | Brubaker | 260/63 |
| 3,694,412 | 9/1972 | Nozaki | 260/63 |
| 3,948,885 | 4/1976 | Hudgin | 524/417 |
| 4,594,382 | 6/1986 | Hoenig et al. | 524/394 |
| 4,746,686 | 5/1988 | Waller | 524/417 |
| 4,761,448 | 8/1988 | Klottz et al. | 524/612 |
| 4,843,144 | 6/1989 | Van Broekhoven et al. | 528/612 |
| 4,880,903 | 11/1989 | Van Broekhoven et al. | 528/392 |
| 4,937,279 | 6/1990 | Betso et al. | 524/417 |
| 5,021,496 | 6/1991 | Machado et al. | 524/417 |

FOREIGN PATENT DOCUMENTS 57109848 6/1980 Japan .
1081304 4/1967 United Kingdom .

OTHER PUBLICATIONS

Degradation and Stabilization of Polymers, Elsevier, 1983, pp. 210–211.

Primary Examiner—Kriellion S. Morgan
Attorney, Agent, or Firm—Denise Y. Wolfs

[57] ABSTRACT

Polymer compositions comprising an intimate mixture of a linear alternating polymer of carbon monoxide and at least one ethylenically unsaturated hydrocarbon and a hydroxyapatite demonstrate improved stability.

30 Claims, No Drawings

STABILIZED POLYKETONE POLYMERS

FIELD OF THE INVENTION

This invention relates to polyketone polymers, and, more particularly, to compositions of a polyketone polymer and calcium hydroxyapatite, characterized by improved stability.

BACKGROUND OF THE INVENTION

The class of polymers of carbon monoxide and olefins has been known for some time. U.S. Pat. No. 2,495,286 (Brubaker) discloses such polymers of relatively low carbon monoxide content in the presence of free radical initiators, e.g., peroxy compounds. G.B. 1,081,304 discloses similar polymers of higher carbon monoxide content in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. 4,880,903 (VanBroekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using the preferred catalyst comprising a compound of palladium, the anion of a non-hydrohalogenic acid having a pKa of below about 6 and a bidentate ligand of phosphorus.

The resulting polymers are relatively high molecular weight materials having established utility as premium thermoplastics in the production of shaped articles, such as containers for food and drink and parts for the automotive industry, which are produced by processing the polyketone polymer according to well known methods.

SUMMARY OF THE INVENTION

The present invention provides certain stabilized polymeric compositions of linear alternating polymers of carbon monoxide and at least one ethylenically unsaturated hydrocarbon, and a process for the production of such stabilized compositions. The compositions are stabilized with a hydroxyapatite of the formula $M_{10}(PO_4)_6(OH)_2$, where M is barium (Ba), strontium (Sr), or calcium (Ca). More particularly, the invention provides compositions comprising the linear alternating polymer having calcium hydroxyapatite incorporated therein. The resulting compositions demonstrate improved stability upon being subjected to melt processing conditions.

DESCRIPTION OF THE INVENTION

The stabilized polyketone polymers of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

$$[CO-CH_2-CH_2)]_x[CO-G)]_y$$

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the $-CO-CH_2CH_2-$ units and the $-CO-G-$ units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of and the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

During melt processing, the neat polyketone polymer exhibits an undesirable viscosity increase. It is most desirable for a thermoplastic polymer to have little or no viscosity increase during processing. Most commercial-grade engineering thermoplastics exhibit little or no change in viscosity during melt processing because of the presence of an additive package selected to minimize such a change in properties. For example, U.S. 2,493,597 identifies organic esters of phosphorous acid as melt viscosity stabilizers for polyamides.

It is an object of this invention to stabilize the polyketone polymers so that they remain unchanged upon being subjected to conditions which would otherwise bring about a change in their properties. This object is realized by adding a stabilizing agent to the polyketone polymer.

The stabilized compositions of the invention comprise an intimate mixture of the linear alternating polymer and a hydroxyapatite of the formula $M_{10}(PO_4)_6(OH)_2$, where M is barium (Ba), strontium (Sr), or calcium (Ca). The preferred hydroxyapatite is calcium hydroxyapatite, $Ca_{10}(PO_4)_6(OH)_2$, a naturally occurring calcium phosphate and the major constituent of bone and tooth mineral. It is a finely divided, crystalline, non-stoichiometric material rich in surface ions which are readily replaced by fluoride ions. Calcium hydroxyapatite is also referred to as tribasic calcium phosphate.

The amount of hydroxyapatite present in the compositions of the invention is not critical, as long as a stabilizing quantity is present and other important polymer properties for the intended use are not adversely affected. The precise amount required for melt stabilization will depend upon a variety of factors, such as the melt temperature, the polymer's LVN, and other additives interactive effects. Compositions containing less than 0.01 wt % to 5.0 wt % or more hydroxyapatite exhibit improved melt stability, relative to the unstabilized polymer. Compositions containing from less than about 0.01 wt % to about 1.0 wt % hydroxyapatite are believed to exhibit desirable melt stability, with compositions containing less than about 0.01 wt % to about 0.5 wt % hydroxyapatite being preferred for a wide variety of uses.

The polyketone polymer and the hydroxyapatite are compounded by any method suitable for forming an intimate mixture of the polymer and stabilizer. Such methods include dry blending of the polymer and stabilizer in a finely divided form, followed by hot pressing or extrusion of the mixture. The composition may also be produced by blending the components in a melt mixing device. Alternatively, the hydroxyapatite can be included with the reactants entering the polymerization reactor, or added to the reactor product slurry prior to pelletization.

The compositions of the invention may also include other additives such as antioxidants, dyes, fillers or reinforcing agents, fire resistant materials, mold release agents, colorants and other materials designed to improve the processability of the polymers or the properties of the resulting blend. Such additives are added prior to, together with, or subsequent to the blending of the polyketone and hydroxyapatite. The presence of these additives may affect the optimum level of hydroxyapatite for a given application.

The compositions are processed by methods such as extrusion and injection molding into sheets, films, plates and shaped parts. The compositions of the invention are particularly useful for the production of articles by multiple melting/crystallization cycles, and where elevated temperatures are likely to be encountered. Illustrative of such applications are the production of articles useful in both rigid and flexible packaging applications, and in both internal and external parts for automotive use; fibers useful in yarns, tire cord, and fabric; and coatings for a variety of materials.

While not wishing to be bound by any particular theory, it is speculated that the hydroxyapatite may play a role in neutralizing the effect of impurities present in the polyketone polymer that cause a viscosity increase during the melt phase, and/or inhibit crystallization upon cooling. For example, calcium hydroxyapatite is the most basic of the naturally occurring phosphates and can exchange Ca ions for the Na ions that are known to destabilize the polyketone polymer during melt processing.

The invention is further illustrated by the following Examples which should not be regarded as limiting.

EXAMPLE 1

A linear alternating terpolymer of carbon monoxide, ethylene, and propylene (89/071) was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.8 dl/g when measured in m-cresol at 60° C. The polyketone polymer also contained 0.5% Ethanox 330 and 0.5% Nucrel 535.

EXAMPLE 2

A portion of the polymer of Example 1 was ground to 60 mesh, and then powder-mixed with calcium hydroxyapatite (with a theoretical molar ratio of 1.67 Ca/P) in a Henschel mixer for 5 minutes. Samples containing various concentrations of calcium hydroxyapatite were prepared, as shown in Table 1. The samples were compounded in a 30 mm Braebender extruder, operating at 150 rpm with melt temperatures between 230° and 260° C. The viscosity of each sample was determined over time in the melt in a Rheometrics parallel plate rheometer. Table 1 lists the initial melt viscosity and the viscosity after 10 minutes. During commercial processing, polymers are typically in a melt phase for less than 10 minutes.

TABLE 1

| Calcium Hydroxyapatite (ppm) | Viscosity (Pa.-sec.) | |
|---|---|---|
| | 0 min. | 10 min |
| 0 | 965 | 4820 |
| 41 | 965 | 3300 |
| 410 | 965 | 3600 |
| 2,500 | 965 | 3437 |
| 10,000 | 965 | 2475 |

Addition of the calcium hydroxyapatite at a concentration of 41 ppm reduced the viscosity of the melt phase polymer by 31%, relative to the neat polymer control, after 10 minutes. The sample containing 410 ppm calcium hydroxyapatite also exhibited a lower viscosity, relative to the control, after 10 minutes. Higher concentrations were even more effective at limiting the viscosity increase.

EXAMPLE 3

A linear alternating terpolymer of carbon monoxide, ethylene, and propylene 89/056 was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.1 dl/g when measured in m-cresol at 60° c. The polyketone polymer also contained 0.5% Ethanox 330 and 0.5% Nucrel 535.

EXAMPLE 4

A portion of the polymer described in Example 3 was utilized to prepare samples containing various concentrations of the same calcium hydroxyapatite and by the same procedure described in Example 2. The viscosity of each sample was determined over time in the melt in a Rheometrics parallel plate rheometer. Table 2 lists the initial melt viscosity and the viscosity after 10 and 28 minutes.

TABLE 2

| Calcium Hydroxyapatite (wt %) | Viscosity (Pa-sec.) | | |
|---|---|---|---|
| | 0 min | 10 min | 28 min |
| 0 | 80 | 150 | 1400 |
| 0.5 | 80 | 85 | 300 |
| 1.0 | 80 | 85 | 250 |
| 5.0 | 80 | 84 | 210 |

The results demonstrate that the addition of calcium hydroxyapatite can mitigate the viscosity increase that would otherwise occur without the stabilizer. The results indicate a more pronounced viscosity reduction, relative to the control sample, than the samples shown in Example 2. This is due to the lower LVN, and lower molecular weight, of the polymer in this Example.

EXAMPLE 5

The polyketone terpolymer described in Example 1 and the samples described in Example 2 were evaluated in a differential scanning calorimeter (DSC). The tests were run with a Perkin-Elmer DSC, which employs sealed pan containers. The pan and contents were heated at a controlled rate, typically 20° C./min, until the sample melted. The pan and contents were then cooled until the sample solidified or partially crystallized. The samples were then heated to 275° C., maintained at that temperature for 10 minutes, and then cooled again. The holding temperature of 275° C. is typical for commercial melt processing operations. The first and second heats of crystallization ($HC_1$ and $HC_2$) of the samples were determined, in calories per gram, through use of the DSC. The values for $HC_1$ and $HC_2$ for each sample are shown in Table 3.

TABLE 3

| Hydroxyapatite ppm | $HC_1$ (Cal/g) | $HC_2$ (Cal/g) | $HC_2/HC_1$ |
|---|---|---|---|
| 0 | 16.5 | 10.8 | 0.65 |
| 41 | 17.1 | 12.9 | 0.75 |
| 410 | — | — | 0.85 |
| 2,500 | 16.7 | 15.4 | 0.92 |
| 10,000 | 17.2 | 16.3 | 0.95 |

In general, the heat of crystallization for a stabilized polymer will be greater than the corresponding value for an unstabilized polymer. However, the heat of crystallization for a stabilized polymer will decrease over repeated heating/cooling cycles. The heat of crystallization serves as an indication of the amount of crystallinity of the polymer. Degradation of the polymer during heating can inhibit crystallization upon cooling. The ratio of $HC_2$ to $HC_1$ for a given sample serves as a measure of the degree of crystallinity maintained over the two heating cycles. For a polymer exhibiting ideal melt stability (assuming no nucleating effects), this ratio is 1. The $HC_2/HC_1$ ratios for each sample is also shown in Table 3.

The $HC_2/HC_1$ ratios indicate that even a small amount of calcium hydroxyapatite (41 ppm) provided a significant increase in the amount of crystallinity maintained during a second heating/cooling cycle. Higher concentrations were even more effective to maintain crystallinity.

EXAMPLE 6

The extruded nibs from the processing described in Example 2 were dried overnight, and specimens of the compounded samples were molded into 30 mil plaques on a 1.5 ounce Arburg injection molding machine. The plaques were submitted for oven aging tests.

The test plaques were placed in an oven maintained at 125° C. Periodically, test plaques were withdrawn and bent over an angle of 180° C. When the plaque cracked, the time to embrittlement (or failure) was determined as a function of time. All samples exhibited a time to failure of about 10 days, indicating that the calcium hydroxyapatite had no apparent effect on oven aging.

What is claimed is:

1. A stabilized polymer composition comprising:
a linear alternating polymer of carbon monoxide and at least one ethylenically unsaturated hydrocarbon; and
a stabilizer selected from the group consisting of calcium hydroxyapatite and tribasic calcium phosphate, wherein the stabilizer is present in an amount from about 0.01 wt % to about 5 wt %, based on total composition.

2. The composition of claim 1 wherein the polymer is of the repeating formula $$-CO-CH_2-CH_2)]_x[CO-(-G)]_y$$

wherein G is a moiety of an ethylenically unsaturated hydrocarbon of at least 3 carbon atoms, polymerized through the ethylenic unsaturation, and the ratio of y:x is no more than about 0.5.

3. The composition of claim 2 wherein the stabilizer is calcium hydroxyapatite.

4. The composition of claim 2 wherein the stabilizer is tribasic calcium phosphate.

5. The composition of claim 3 wherein y is 0.

6. The composition of claim 3 wherein the ratio of y:x is from 0.01 to about 0.1.

7. The composition of claim 3 wherein G is a moiety of propylene.

8. The composition of claim 3 wherein the calcium hydroxyapatite is present in a quantity of from about 0.01 wt % to about 1.0 wt %, based on total composition.

9. A composition stabilized against a change in viscosity during melt processing which comprises a linear alternating polymer of carbon monoxide and at least one ethylenically unsaturated hydrocarbon having incorporated therein from about 0.01 wt % to about 5 wt %, based on total composition, of a stabilizer selected from the group consisting of calcium hydroxyapatite and tribasic calcium phosphate.

10. The composition of claim 9 wherein the polymer is of the repeating formula $$-CO-CH_2-CH_2)]_x[CO-(-G)]_y$$

wherein G is a moiety of an ethylenically unsaturated hydrocarbon of at least 3 carbon atoms, polymerized through the ethylenic unsaturation, and the ratio of y:x is no more than about 0.5.

11. The composition of claim 10 wherein the stabilizer is calcium hydroxyapatite.

12. The composition of claim 10 wherein the stabilizer is tribasic calcium phosphate.

13. The composition of claim 12 wherein y is 0.

14. The composition of claim 12 wherein the ratio of y:x is from 0.01 to about 0.1.

15. The composition of claim 12 wherein G is a moiety of propylene.

16. The composition of claim 12 wherein the tribasic calcium phosphate is present in a quantity of from about 0.01 wt % to about 1.0 wt %, based on total composition.

17. A composition stabilized against loss of apparent crystallinity when subjected to melting and crystallization cycles which comprises a linear alternating polymer of carbon monoxide and at least one ethylenically unsaturated hydrocarbon having incorporated therein from about 0.01 wt % to about 5 wt % of a stabilizer selected from the group consisting of calcium hydroxyapatite and tribasic calcium phosphate.

18. The composition of claim 17 wherein the polymer is of the repeating formula $$-CO-CH_2-CH_2)]_x[CO-(-G)]_y$$

wherein G is a moiety of an ethylenically unsaturated hydrocarbon of at least 3 carbon atoms, polymerized through the ethylenic unsaturation, and the ratio of y:x is no more than about 0.5.

19. The composition of claim 18 wherein the stabilizer is calcium hydroxyapatite.

20. The composition of claim 18 wherein the stabilizer is tribasic calcium phosphate.

21. The composition of claim 19 wherein y is 0.

22. The composition of claim 19 wherein the ratio of y:x is from 0.01 to about 0.1.

23. The composition of claim 19 wherein G is a moiety of propylene.

24. The composition of claim 19 wherein the calcium hydroxyapatite is present in a quantity of from about 0.01 wt % to about 1.0 wt %, based on total composition.

25. A method of stabilizing a linear alternating polymer of carbon monoxide and at least one ethylenically unsaturated hydrocarbon by incorporating therein from about 0.01 wt % to about 5 wt %, based on total composition, of a stabilizer selected from the group consisting of calcium hydroxyapatite and tribasic calcium phosphate.

26. The method of claim 25 wherein the polymer is of the repeating formula $$-CO-CH_2-CH_2)]_x[CO-(-G)]_y$$

wherein G is a moiety of an ethylenically unsaturated hydrocarbon of at least 3 carbon atoms polymerized through the ethylenic unsaturation, and the ratio of y:x is no more than about 0.5.

27. The method of claim 26 wherein the stabilizer is tribasic calcium phosphate present in an amount of from about 0.01 wt % to about 1.0 wt %, based on total composition.

28. The method of claim 27 wherein y is 0.

29. The method of claim 27 wherein the ratio of y:x is from about 0.01 to about 0.1.

30. The method of claim 29 wherein G is a moiety of propylene.

* * * * *